(12) United States Patent
Keane et al.

(10) Patent No.: US 12,001,978 B1
(45) Date of Patent: Jun. 4, 2024

(54) SYSTEMS AND METHODS FOR MANAGING WORKPLACE ACCOMMODATIONS

(71) Applicant: Disclo Inc., Dover, DE (US)

(72) Inventors: Kai Keane, Austin, TX (US); Hannah Olson, Atlanta, GA (US)

(73) Assignee: DISCLO INC., Dover, DE (US)

( * ) Notice: Subject to any disclaimer, the term of this patent is extended or adjusted under 35 U.S.C. 154(b) by 0 days.

(21) Appl. No.: 18/297,333

(22) Filed: Apr. 7, 2023

Related U.S. Application Data

(60) Provisional application No. 63/329,118, filed on Apr. 8, 2022.

(51) Int. Cl.
*G06Q 10/06* (2023.01)
*G06Q 10/0631* (2023.01)

(52) U.S. Cl.
CPC .......................... *G06Q 10/063118* (2013.01)

(58) Field of Classification Search
CPC .................................................... G06Q 10/06
See application file for complete search history.

(56) References Cited

U.S. PATENT DOCUMENTS

| | | | |
|---|---|---|---|
| 7,797,771 B1 * | 9/2010 | Bossen | G16H 50/30 706/50 |
| 2008/0027746 A1 * | 1/2008 | Exall | G06Q 10/10 705/317 |
| 2013/0132122 A1 * | 5/2013 | Walsh | G06Q 40/08 705/4 |
| 2014/0136216 A1 * | 5/2014 | Beebe | G06Q 40/08 705/2 |
| 2014/0279637 A1 * | 9/2014 | Rafaty | G06Q 10/1053 705/321 |
| 2015/0019278 A1 * | 1/2015 | Belval | G06Q 10/063116 705/7.16 |
| 2016/0253910 A1 * | 9/2016 | Fisher | G09B 5/02 434/236 |

FOREIGN PATENT DOCUMENTS

WO WO-2006097898 A2 * 9/2006 ............. G06Q 10/00

OTHER PUBLICATIONS

American Psychological Association, Reasonable Accommodations Explained, apa.org, Date created: 2012. (Year: 2012).*

* cited by examiner

*Primary Examiner* — Kurtis Gills
(74) *Attorney, Agent, or Firm* — Smith, Gambrell & Russell, LLP; Michael J. Riesen

(57) ABSTRACT

Methods and systems are described by which employees and employers may generate a request for a workplace accommodation based on a disability, evaluate whether the workplace accommodation is appropriate given the disability, validate from a medical provider that the workplace accommodation is necessary, suggest alternative workplace accommodations, and confirm that the workplace accommodation has been provided.

13 Claims, 11 Drawing Sheets

| Event Type | Action | Visibility |
|---|---|---|
| Account | Logged in | User |
| Account | User information changed | User |
| Case | Created | Employee |
| Case | Draft updated | Employee |
| Case | Draft updated | Employee |
| Case | Submitted | Employee, HR Admins |
| Case | Canceled | Employee, HR Admins |
| Case | Approved | Employee, HR Admins |
| Case | Added to case | Employee, HR Admins |
| Case | Verification requested | Employee, HR Admins |
| Case | Verification approved | Employee, HR Admins |
| Case | Verification failed | Employee, HR Admins |
| Case | Viewed | Employee, HR Admins |

FIG. 5

SYSTEMS AND METHODS FOR MANAGING WORKPLACE ACCOMMODATIONS

CROSS-REFERENCE TO RELATED APPLICATION

This application is a Non-Provisional of and claims the benefit to U.S. Provisional Patent Application Ser. No. 63/329,118, filed Apr. 8, 2022, which is hereby incorporated by reference in its entirety.

BACKGROUND OF THE INVENTION

Currently, many employees are reluctant to disclose an impairment or disability to an employer, even though the employer may be required to provide certain accommodations for the employee with a disability. Employees may feel that their medical records and history are protected health information (PHI), not to be shared with their employer. Employees may fear stigma attached to disclosing that they are affected by certain medical conditions, some of which may not be obvious or visible to the naked eye. Likewise, an employer may not wish to know details of an employee's medical history, even though they may be willing to provide accommodations if they knew.

Improvements are needed.

SUMMARY OF THE INVENTION

The present disclosure relates to methods and systems for managing workplace accommodations. As used herein, accommodation may include any workplace enhancement. Workplace accommodations may comprise as non-limiting examples a change or adjustment to a job function, a work environment, or process or procedure that would allow an individual to apply for a job, perform job functions, or enjoy equal access to benefits available to other individuals in the workplace. Such workplace accommodations may be based on a need, limitation, disability, or impairment of an individual or group of individuals. As used herein, the term disability may comprise any need, limitation, or impairment.

The present disclosure relates to methods and systems by which users (e.g., as non-limiting examples employees, interviewees, etc.) and additional users (e.g., as non-limiting examples employers, interviewers, etc.) may generate a request for an accommodation based on a disability, evaluate whether the accommodation is reasonable, validate from a medical provider that the accommodation is necessary, and confirm that the accommodation has been administered.

The present disclosure may also relate to proposing or suggesting alternative accommodations for an impaired employee. As used herein, an employee may include any user in various disclosure settings including as non-limiting examples an interviewer or interviewee in an interview setting. The terms employee or employer are not intended to limit the present disclosure or the claims to any particular user-user relationship.

Accordingly, the present disclosure addresses shortcomings of the prior art. The present disclosure relates to providing a capability to let an employee know what accommodations are available to them, and to disclose to an employer what accommodations are required without sharing details of the medical history of the employee with the employer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only example embodiments of this disclosure and the disclosure may admit to other equally effective embodiments.

FIG. 5 illustrates details of an example audit log.

Figure 1:
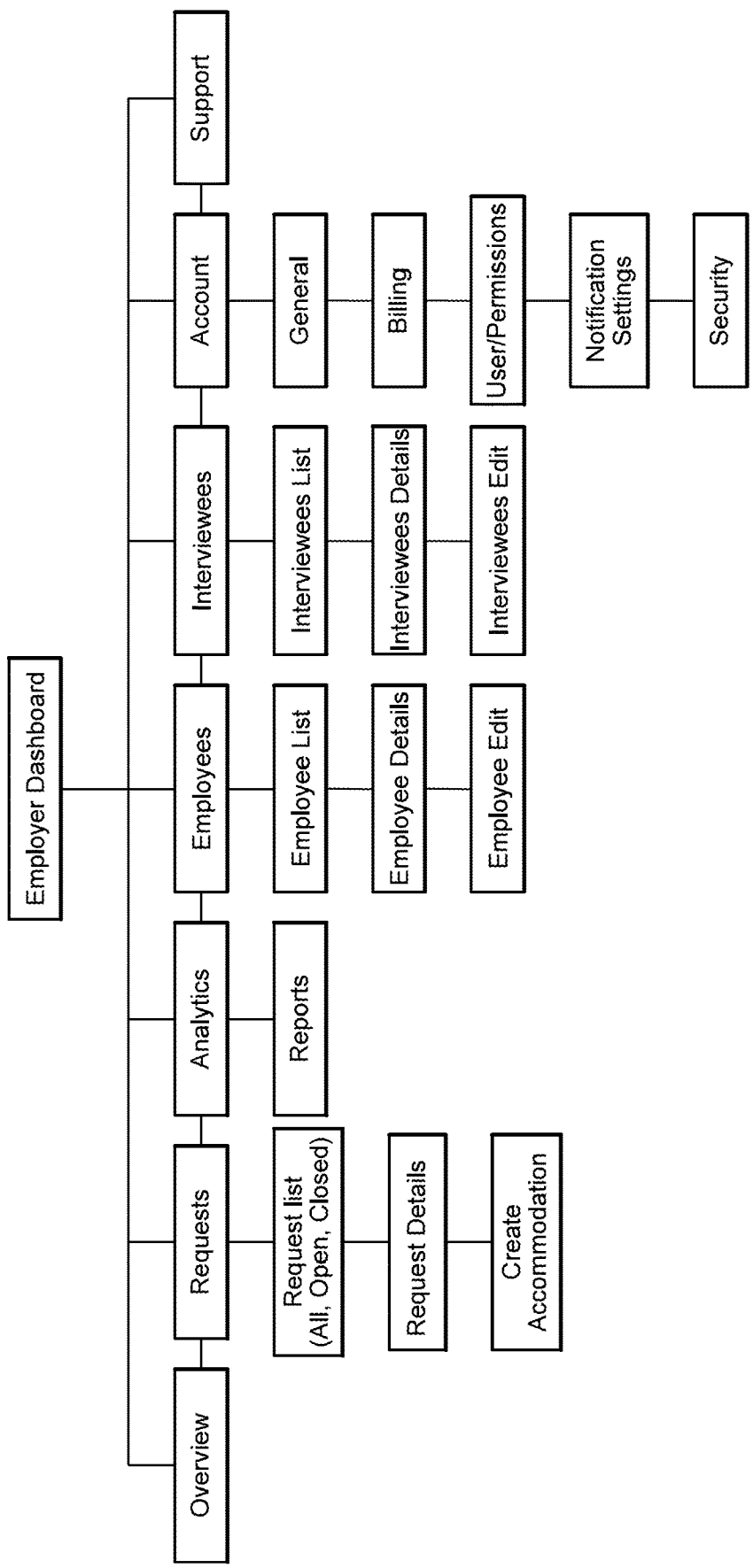
FIG. 1 illustrates an example employer dashboard.

Other features of the present embodiments will be apparent from the Detailed Description that follows.

DETAILED DESCRIPTION

In the following detailed description of the preferred embodiments, reference is made to the accompanying drawings, which form a part hereof, and within which are shown by way of illustration specific embodiments by which the disclosure may be practiced. It is to be understood that other embodiments may be utilized and structural changes may be made without departing from the scope of the disclosure. Electrical, mechanical, logical, and structural changes may be made to the embodiments without departing from the spirit and scope of the present teachings. The following detailed description is therefore not to be taken in a limiting sense, and the scope of the present disclosure is defined by the appended claims and their equivalents.

The present disclosure relates to methods and systems for improving the exchange of information about workplace accommodations, including but not limited to reasonable workplace accommodations, employers are required to provide to their employees without disclosing additional details of an employee's medical history or other protected health information.

The potential stigma associated with a workplace disclosure is a reason cited by employees with non-apparent disabilities to keep these issues concealed at work, even in the face of an understanding that revealing these disabilities could allow the employees to avail themselves of accommodations from their employer. Other reasons cited for declining to disclose a hidden disability in the workplace include:

Denial or Lack of Awareness. Individuals might not detect or accept their own disabilities. Additionally, to some people dyslexia may be a disability, but to others it may not be a disability but an alternative way of thinking.

Burden of proof. To receive a reasonable accommodation for a hidden disability, an official diagnosis is needed, which requires trips to the doctor, and possible examinations. Those costs may not be covered by the employer.

Social stigma and concern about misperceptions. Employees might choose not to disclose their disability status to avoid uncomfortable situations or bias over different treatment differently, which could be potentially viewed as unfair, enhanced, or inequitable by co-workers.

Some employees may mistakenly believe that temporary disabilities are not recognized disabilities under the ADA.

A Center for Talent Innovation (CTI) study found that 39% of employees with disabilities have disclosed their condition to their manager. Other reports found that an average of 3.2% of employees self-identify to their employers (See Sherbin, L., et al., "Disabilities and Inclusion: Key Findings," Center for Talent Innovation). Comparatively, fewer employees have disclosed to their teams (24%) or HR (21%). In the professional services world, this number is at 4% indicating reluctance to reveal disability status to clients. Employees with disabilities who disclose their disability are more than twice as likely to feel regularly happy or content at work than employees with disabilities who have not disclosed to anyone (65% versus 27%). They are also less likely to regularly feel nervous or anxious (18% versus 40%) or isolated (8% versus 37%).

Research has found that employees who do disclose their disability at work are 30% more engaged—in terms of career satisfaction and aspirations, confidence, and a sense of belonging—than those who don't.

The need for a job accommodation to perform a job or to take care of health issues during the workday is a relevant factor those with a disability consider when deciding whether or not to disclose their condition to their employers—cited by 68 percent of respondents.

To help determine effective accommodations, the Equal Employment Opportunity Commission (EEOC), recommends that employers use an "interactive process," which includes employers and employees with disabilities who request accommodations working together to come up with accommodations. According to the 2021 DMEC Employer Leave Management Survey White Paper, more than two-thirds of employers with under 5000 employees either do not track Americans with Disabilities Act (ADA) requests, or their tracking approach attempts to log information manually (for example, Excel spreadsheets, paper files). This disclosure relates to standardizing and modernizing this process by acting as a clearinghouse for disability disclosures and accommodation requests. An employee may ask for accommodations from their employer without having to disclose their chronic illness or disability. This request for accommodations is possible because a trusted third party may help verify the need.

This improvement assists employees who do not wish to share their illness to their employer. The employee may not even know or understand the proper process to ask for such accommodations. This improvement also aids employers who are now able to manage this data in a safe and organized way that also has the potential of helping to defend against EEOC lawsuits.

The present disclosure relates to enabling employees to request accommodation from an employer for a disability without having to disclose sensitive or protected health information directly to an employer.

Employers may use an interface to engage with their employees to provide accommodation in compliance with the ADA without handling any protected health information. Employers may benefit further in that the system will remind employers to check in to confirm that employees have been administered with the requested accommodation. Employees also benefit in that they can request accommodations without giving access to the underlying medical data to their employers.

As a non-limiting example, protected health information (PHI) is not revealed to a employer, only to a trusted third party. The PHI may not be retrieved from the system except by select, authorized individuals including the employee user, the trusted third party, or a verifier (such as medical providers to whom the employee gave access). In a non-limiting example, an employee user accesses or submits this information using a security token and by signing a Health Insurance Portability and Accountability Act (HIPAA) release form. As an example, the only people with access to the PHI include the employee user, the third party verifier (system administrator), and the medical provider. As a further example, internal staff also will not see the documentation from the medical provider. Analytics provided to an employer would be in aggregate and shown only if enough employees were disclosing so that it would be unlikely to be able to identify that a particular employee by their underlying condition.

In example aspects, all the PHI of the employee will remain protected in a manner compliant with HIPAA. The information is segregated from information shared with the employer's system. Access to the employee's PHI may require password and multi-factor authentication or other equivalent security measures to ensure it is only accessed by the employee or their medical provider. The internal staff of the third party provider may be required to take part in a HIPAA compliance seminar, as needed. As a non-limiting example, electronic communication between users and outside agencies may be secured through encryption or any such data security process known in the art.

Below is a non-limiting example of an overview of example systems and methods disclosed within the present disclosure:
1) Start with employee user requesting an accommodation, which may be passed on to the employer user/HR admin
2) HR admin
   a. Approve→Notify employee user
   b. Deny→Notify employee user
   c. Suggest alternative→Alternative loop
   d. Request Verification→Verification
3) Alternative Loop until mutually agreed
4) Verification by outside party
5) Notify employee user of decision (Approve, Deny)
6) Check-in with employee at later time or during process In this example, a user of the system may refer to an employee of an organization (an employee user) or to an employer representative such as a human resources administrator or HR admin. An overview of the example process is illustrated in FIG. 5 and FIG. 8 with additional details also provided in FIG. 7.

FIG. 5 illustrates an example function of the approval system 100. As illustrated, a user 502 may log on to the system and may be assigned a role 504. Roles include but are not limited to an HR Admin 508, an employee 510 (also an employee user), or an internal staff member 506 of a trusted third party which helps verify eligibility for accommodations. An employee 510 may have a disability 512, which may cause a limitation 514 on a life activity 516, which may require an employer to provide an accommodation 518. The employee 510 may initiate a case 524, which produces a request 520 for an accommodation. The request 520 may also comprise a set of stipulations 522.

In a non-limiting example, an employee 510 may have an injured leg and may require a stool to sit when that employee works as a cashier at an annual outdoor fundraiser for the employer. Once the annual outdoor fundraiser has passed, the employee will no longer require the accommodation. The case 524 may require defining the task 526 the employee must accomplish as well as the timeframe 528. (In the example cited above, the employee 510 with a broken leg will no longer require the stool once the annual event has occurred, but may require other accommodations while the leg is healing, depending on the employee's usual tasks.) The case 524 may also reference a description of the impairment 520, which may be linked to a disability 512 or a limitation 514 on a life activity 516. As part of the case 524, verification 534 of the impairment may be required. The employee 510 knows of their own impairment 530, but may not wish to share this information with the employer or HR admin 508. Thus documentation 532 of the impairment may be provided by the employee 510 or by an outside medical provider (not shown). This external documentation 532 may be verified automatically or may be reviewed by internal staff 506 at the third party verifier.

FIG. 8 illustrates an example interaction between an employee user 510 and the system 100. An employee user 510 may have one or more impairments 530. The employee user 510 may submit a request 520 for an accommodation. At any one time the employee user 510 may submit a single request which may have multiple inputs. The request 510 may start a single case 524 and may also start a single request for verification 534 of the impairment 530. The verification step 534 may require a request for additional information from the employee user and may also require additional documentation 532 from an outside source such as a medical provider. The documentation 532 may be provided directly to the system or the employee user 510 may submit a request for such documentation 532 to be submitted for verification 534. The documentation 532 may include a single piece of information (e.g. as a non-limiting example doctor's note confirming the impairment) or multiple pieces of information (e.g. as non-limiting examples X-rays, MRI scans, multiple diagnoses from multiple doctors). At the verification step 534, the documentation 532 is verified by the system, and the employee user 510 is notified.

Figure 6:
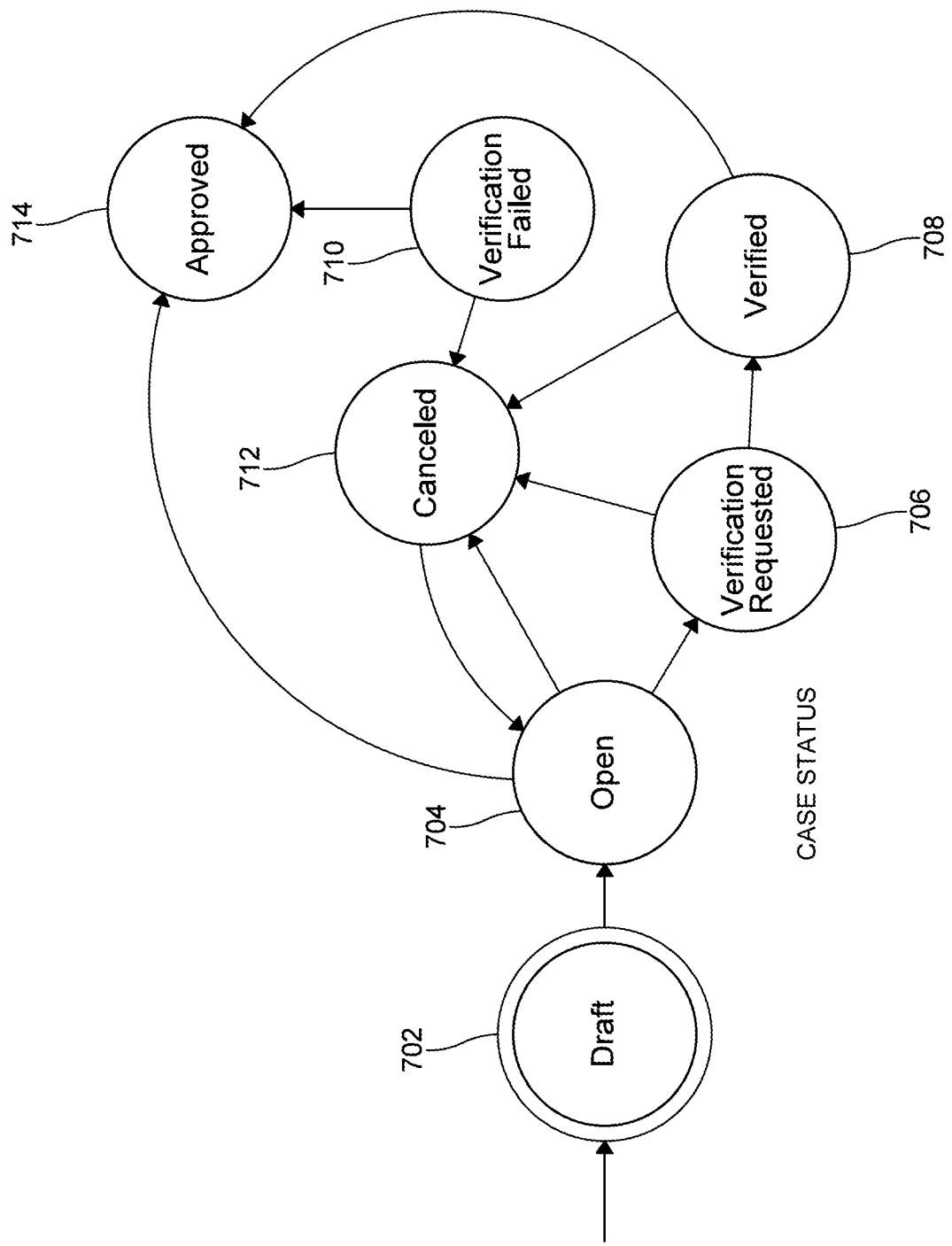
FIG. 6 illustrates details of an example case loop decision pathway.

A user 502 of the system may also have a role 504 as an administrator of the organization or employer, such as a human resources (HR) administrator 508. Another user may have a role as an internal staff member 506 of the third party. Thus there may be at least three types of users: an employee user 510, an employer user 508, sometimes referred to as an HR administrator or HR admin, and an internal staff member 506 of the third party verifying service. There may additionally be more types of users not included in the preceding list, as required by any given application. The HR admin may manage open cases submitted by an employee to the employer. The HR administrator may as non-limiting examples approve cases, update cases, deny cases (with an associated explanation for the denial), request verification, and provide check-in feedback that the accommodation has been administered to/for the employee. The employer's HR administrator 508 may not create new cases nor submit requests nor may the employer user 508 view the full documentation related to any conditions of any of the employees 510. The HR administrator 508 may view a limited audit log of actions related to cases submitted by employees 510 of their same employer. An example audit log is illustrated in FIG. 6. In addition, an HR administrator 508 may request data in an aggregate form, which will not reveal any individual's medical information. Such data includes but is not limited to number of accommodation disclosures, approval rates, number of pending disclosure, productivity metrics, retention rate, cost of implementing accommodation, other metrics or key performance indicators, and other such data related to accommodations.

An employee 510 is part of the employer organization. The employee 510 may create new cases, submit new cases to their employer, cancel existing cases, update request on their cases, provide feedback related to approved accommodations, and view an audit log related to their cases. Only employees may create new cases. An employee 510 user does not have access to cases or information about cases which they have not themselves created or generated. An employee 510 may also submit documentation for disclosure of a disability or verification of a disability.

FIG. 1 illustrates an example employer dashboard. The employer dashboard may start with an overview. Then the requests with a list and details of the request are displayed. Analytics may be reported. The list of employees may be generated with details and the ability to update each employee 510 may be presented. The employees or others may be interviewed. The employer dashboard may also include a set account settings or information.

Figure 2:
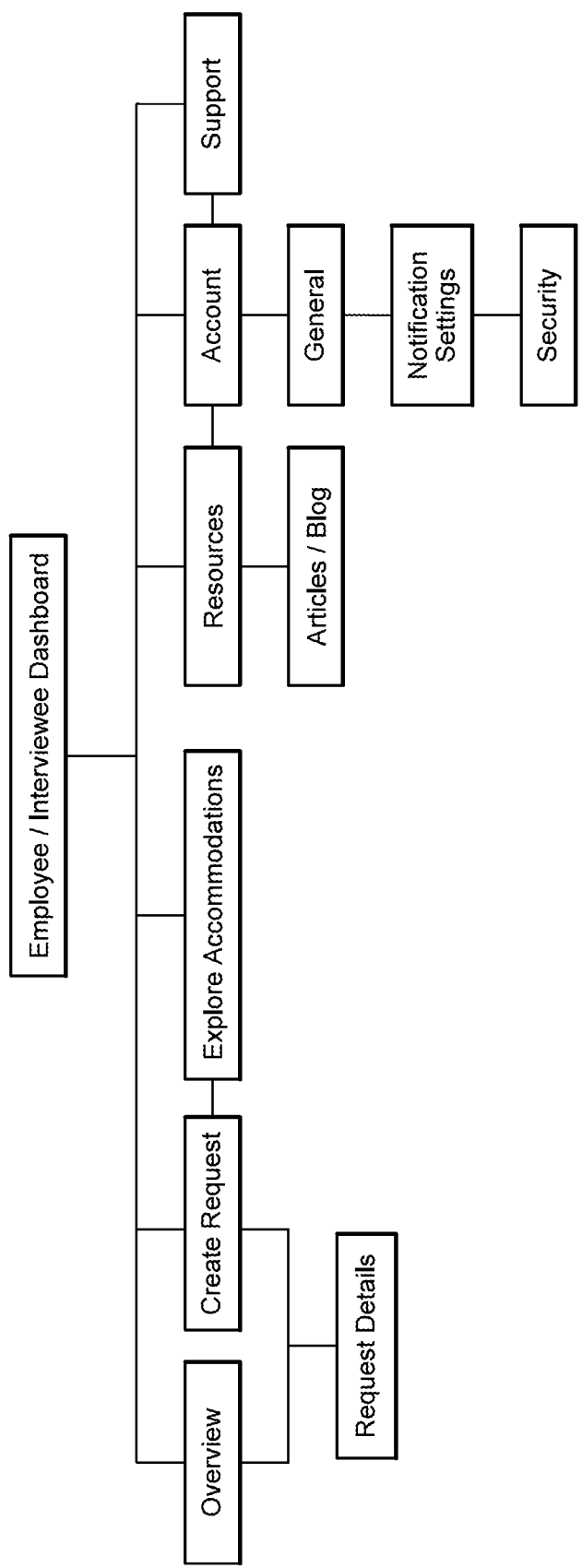
FIG. 2 illustrates an example employee dashboard.
Figure 3A:
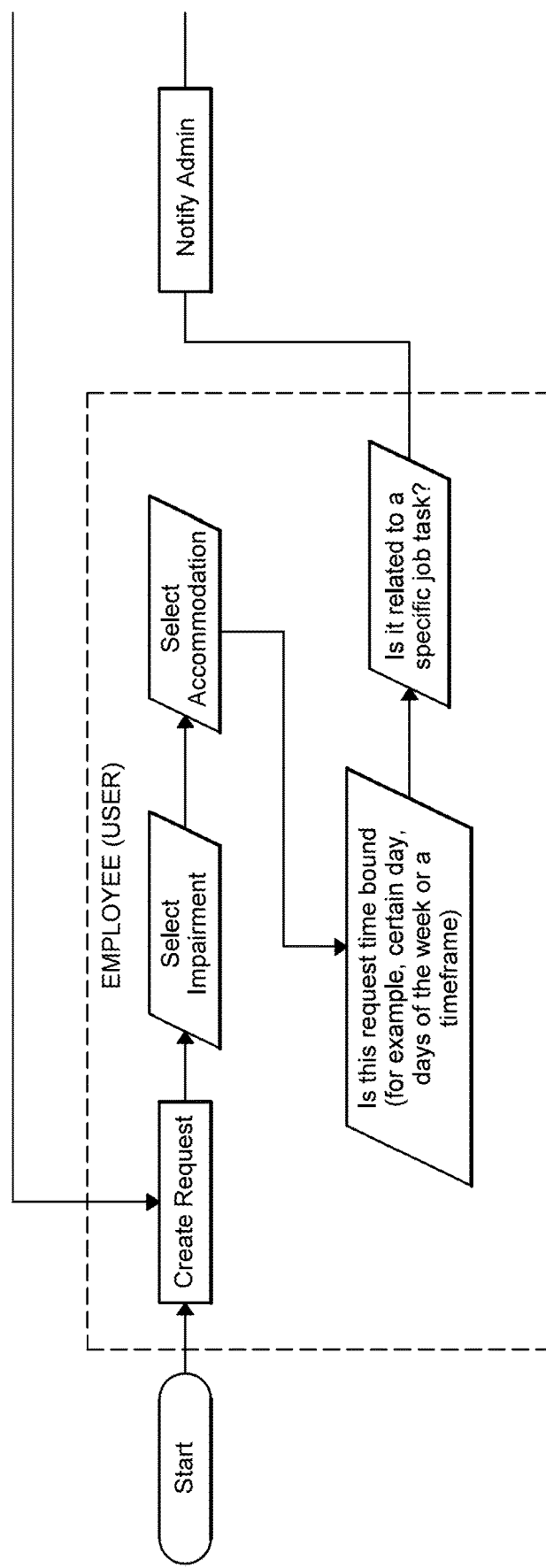
FIGS. 3A-3E illustrate an example employee request lifecycle.
Figure 3B:
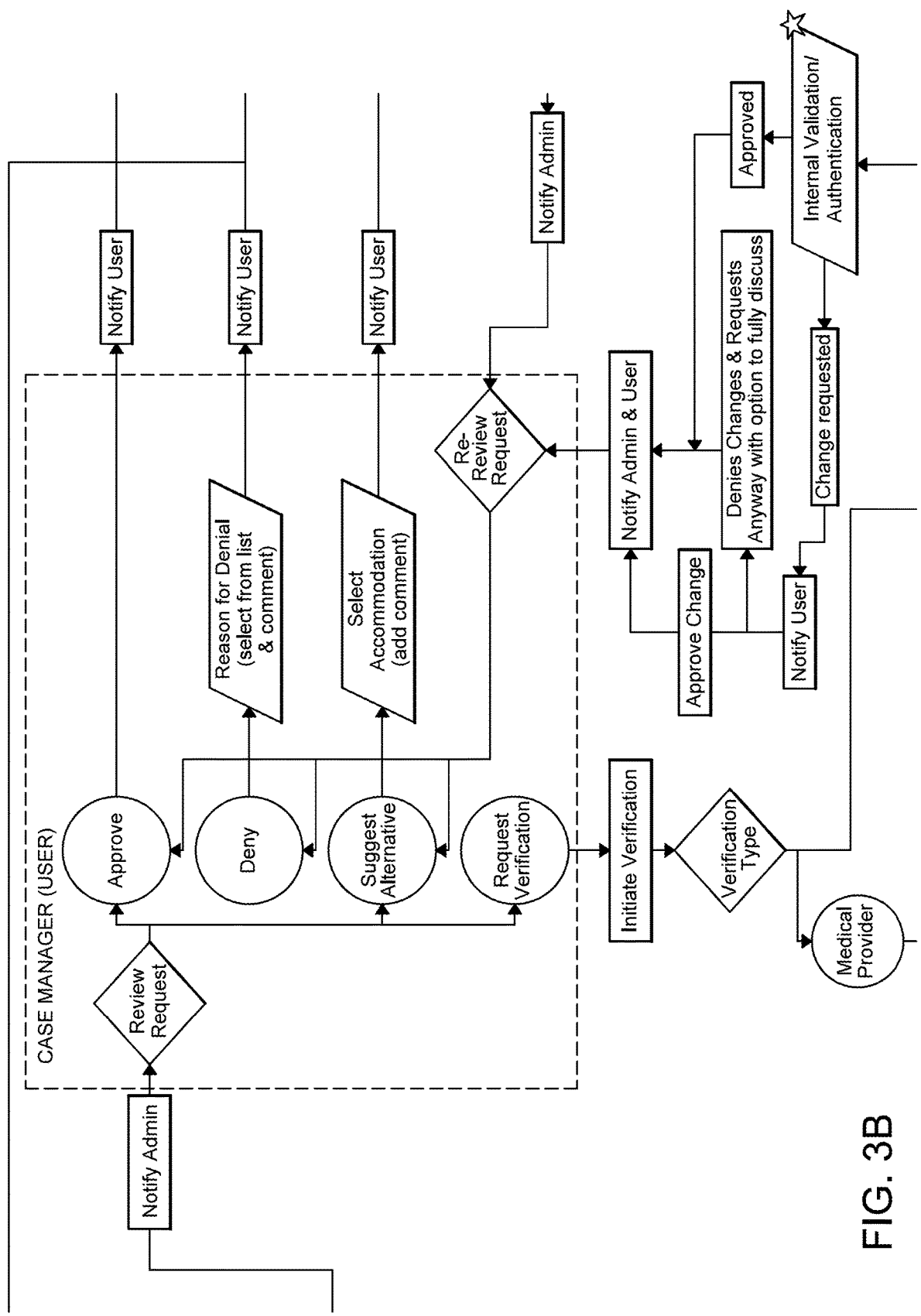
Figure 3C:
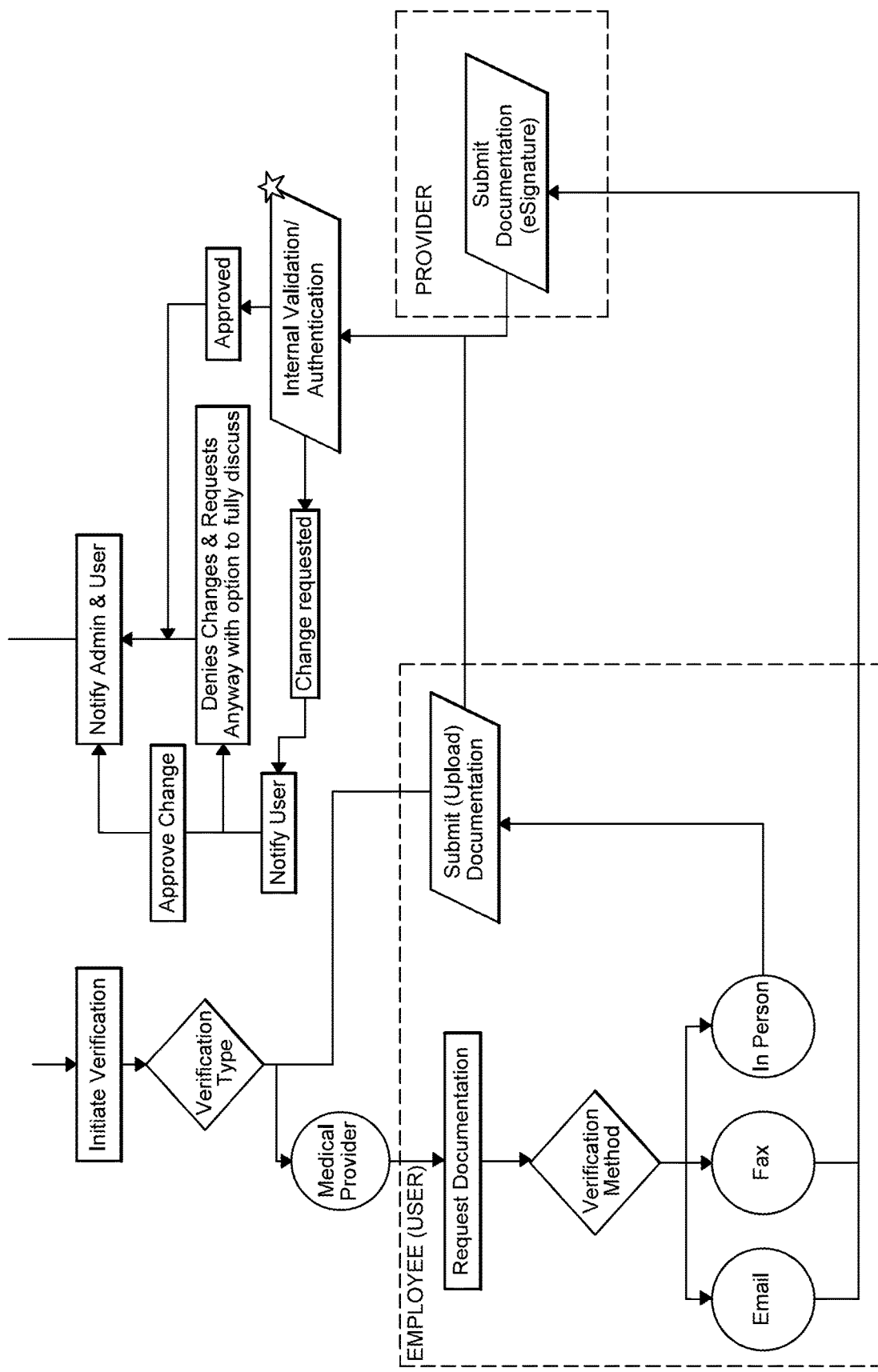
Figure 3D:
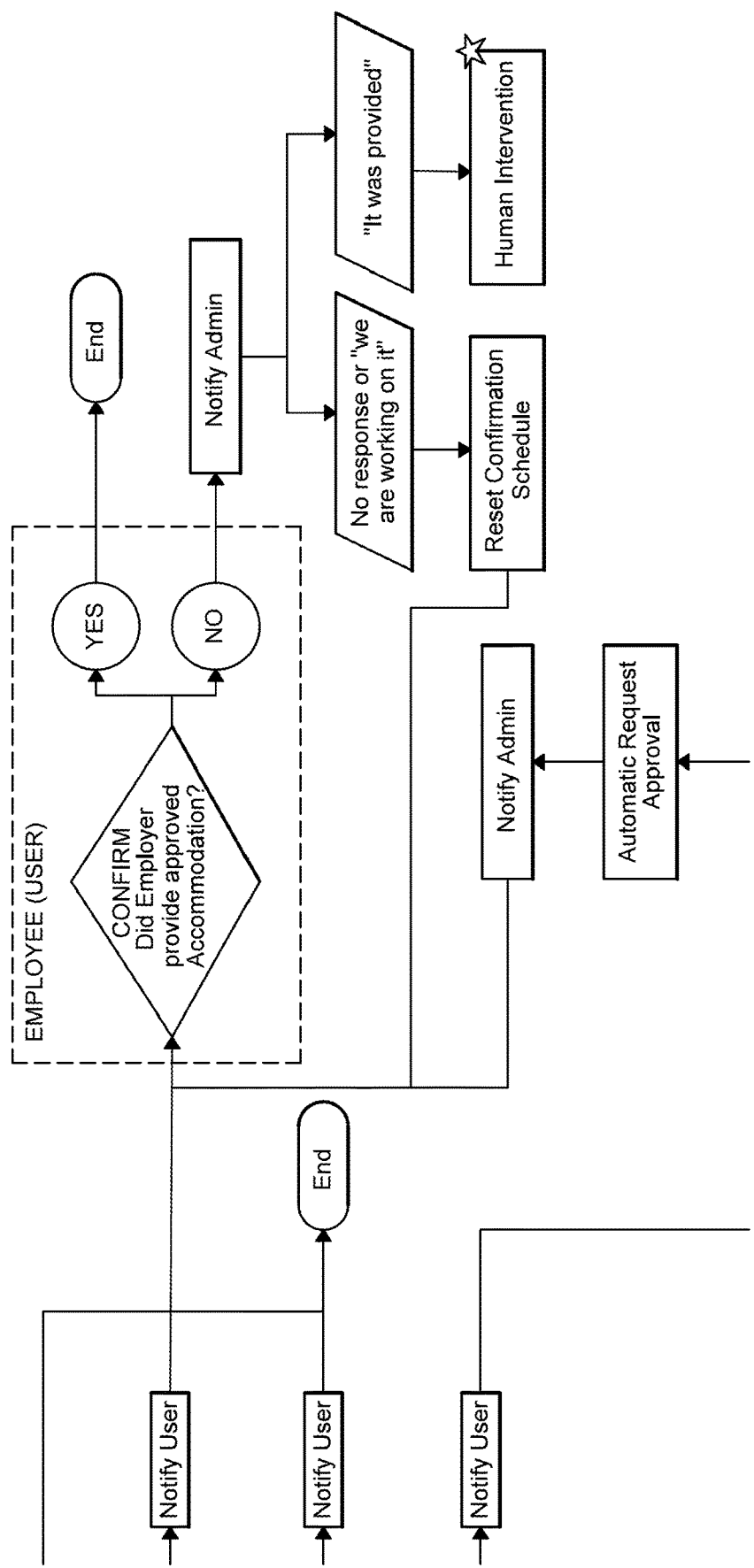
Figure 3E:
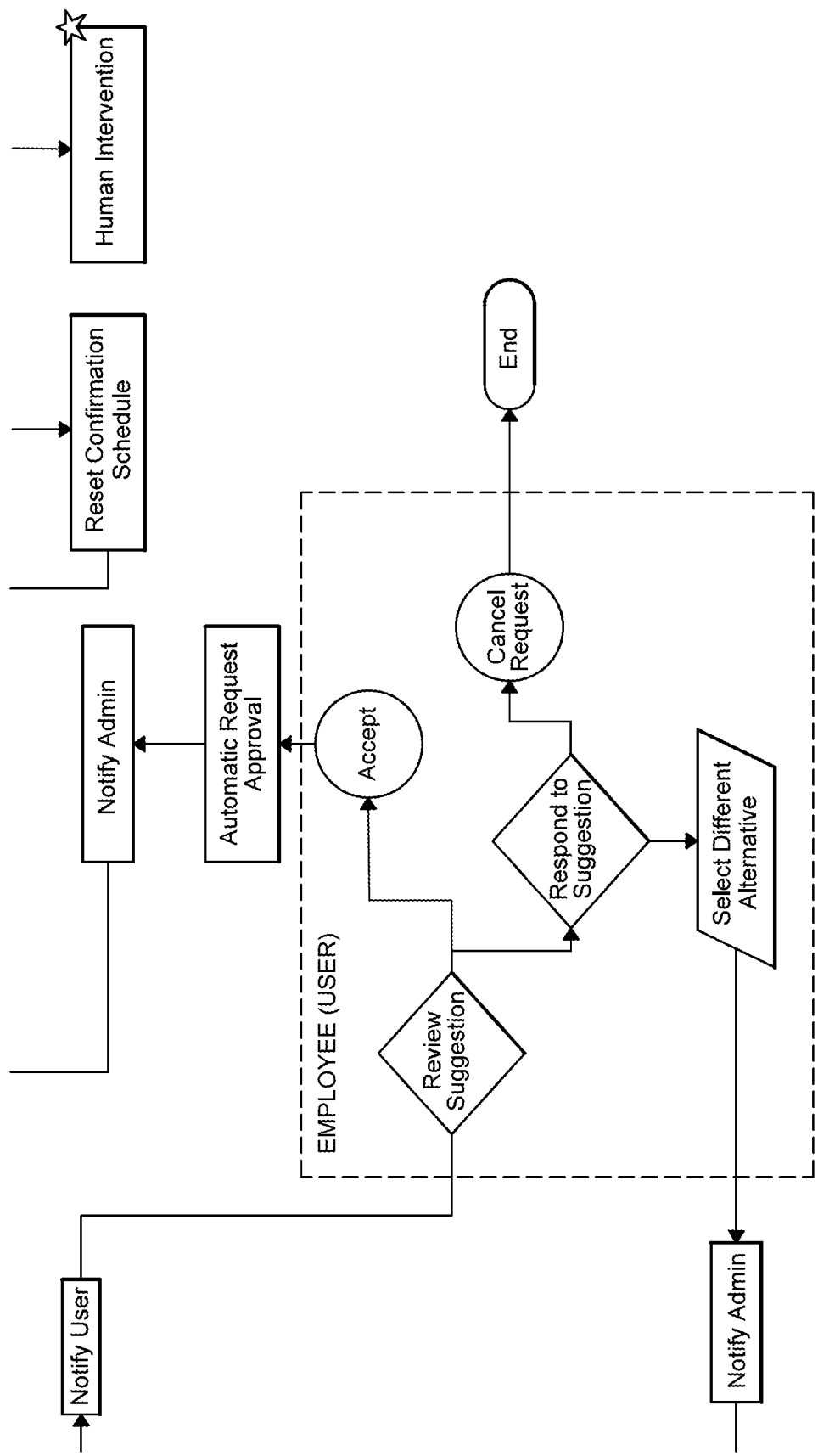
Figure 4:
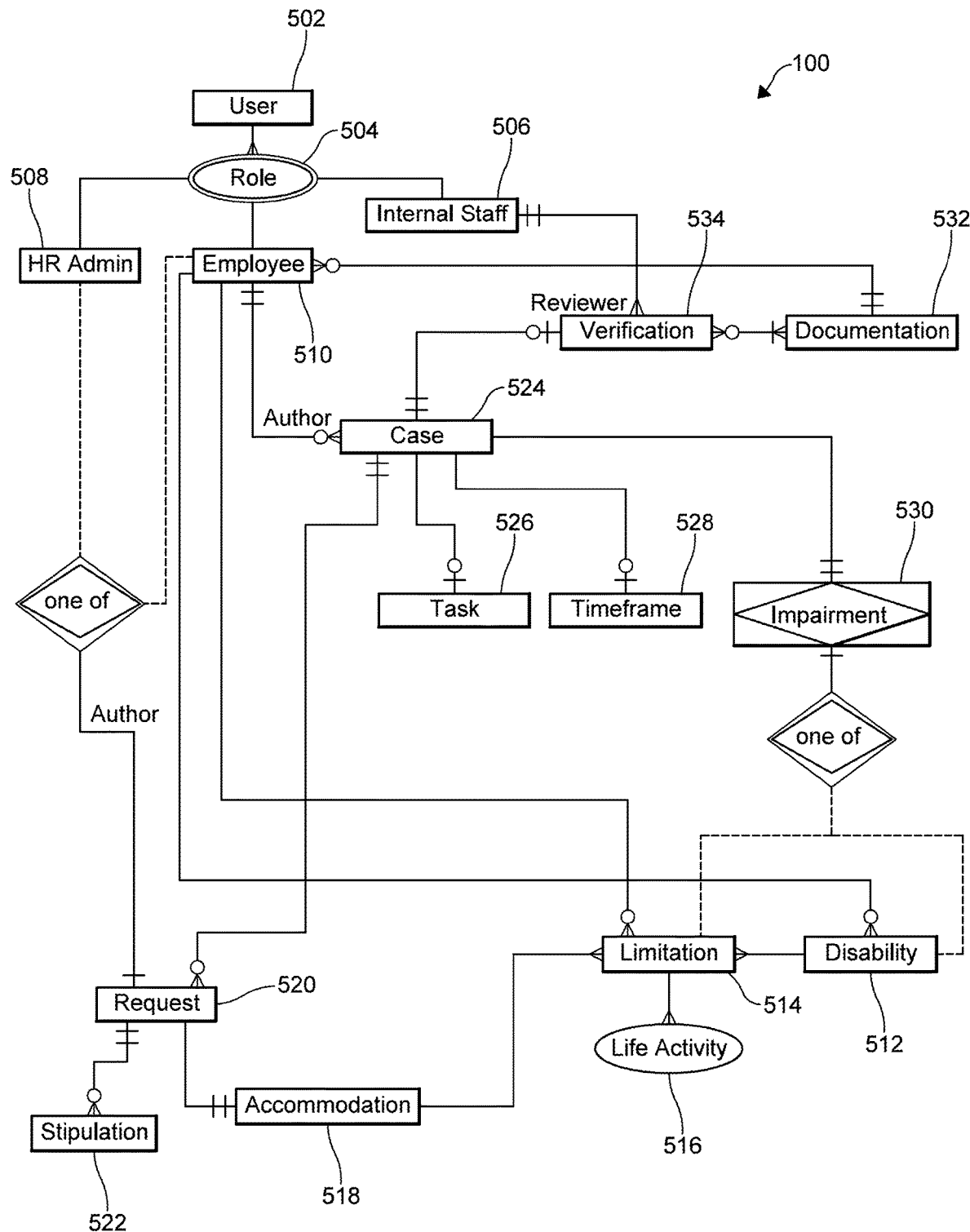
FIG. 4 illustrates details of an example entity or entities.

FIG. 2 illustrates an additional example employee dashboard. The employee 510 starts with an overview and the ability to create a request for an accommodation. The employee 510 may explore the possible accommodations available. From the employee dashboard, the employee 510 may be presented with resources for learning more about accommodations or various medical problems through articles or blogs and interactive forums. The employee dashboard may also provide the ability to edit general account settings.

FIGS. 3A-3F show the overview of an example employee request lifecycle. In this disclosure, the term request usually means "request for accommodation", but the shorthand version "a request" or "the request" may also be used. At the start, the employee 510 or user may create a request for an accommodation. The user selects an impairment. This impairment may not be modified after the request has been submitted. In an embodiment, the employee 510 may select an impairment from a drop-down menu. In another embodiment, the employee 510 may choose a specific disability or may choose a life activity impairment. At another stage, a medical professional may choose the bodily function impairment based on the life activity impairment. The system will evaluate whether this impairment is bounded by a certain time period (e.g. as non-limiting examples, certain day, certain days of the week, or a certain timeframe). The employee 510 may select the time from some common time bounds listed or may enter their own time bounds. Then the employee 510 may select an accommodation. Again the employee 510 may select an accommodation based on a pull down menu, a list, or any other such method. The accommodation request may have stipulations attached. An example stipulation may be a time bound that an employee 510 is requested to participate as a cashier at an annual outdoor event run by the employer. The stipulation to the requested accommodation may include an accommodation (e.g. as a non-limiting example, a stool) which may end once the annual outdoor event finishes. The requested accommodation may be attached to a specific task or tasks. The employee 510 may have the option to save the request without notifying the employer. After the employee 510 is satisfied with the request, the request is submitted.

Submitting the request may include notifying an employer administrator that a request has been submitted. The employer administrator (e.g. as non-limiting examples, the human resources officer, or their delegate) may review the request. The request may be approved, denied, an alternative may be suggested, or a verification requested. If the request is approved, the employee 510 is notified. If the request is denied, the employee 510 may be notified and the reason for the denial may be given. The reason or reasons for the denial may be from a drop-down menu, or from a list, or in an open format. Comments related to the reasons for denial may also be provided. As a non-limiting example, an employee 510 may be notified that the nature of the accommodation is not feasible, the cost of the accommodation is exorbitant, the employer's financial constraints, or that it may unduly interfere with the operation of the business.

If the employer selects an alternative accommodation, the employee may be notified of the alternative accommodation. The employee 510 may review the suggested alternative accommodation. If the employee 510 agrees with the suggested alternative, then that accommodation is automatically approved and the employer administrator will be notified. The employee 510 may also cancel the request for an accommodation. In such an embodiment, only the request for the accommodation may be canceled. That impairment may not be changed or modified at this stage. For a different impairment, another request for accommodation must be submitted. An employee 510 may also add a comment about the suggested alternative and the system will loop until one of these conditions is satisfied: the suggested alternative accommodation is acceptable to both the employee 510 and the employer, the employee 510 cancels the request, or the request is denied.

A disability may be apparent (e.g. as a non-limiting example, employee has lost a leg and has a prosthetic or a wheelchair), but still may require verification from a medical provider. If the disability is not apparent (e.g. as non-limiting examples, depression, obsessive compulsive disorder or other mental illness), then verification may be required. For a nonobvious disability, an example verification may take the form of a letter from a medical provider stating that the disability is a significant impairment.

If verification is required to confirm that accommodations should be provided to an employee 510, then the process proceeds to verification. In verification, a verification type is identified. In an embodiment, a medical provider is requested to supply documentation of the disability. As a non-limiting example, the system may request a medical provider to supply a letter describing the disability. This documentation may be transmitted to the system by electronic means such as fax, e-mail, and the like. This documentation may then be uploaded and sent to the internal validation/authentication person at the employer. In an additional example, a provider may also provide authentication along with or separate from the validation documentation (e.g. as a non-limiting example, electronic signature confirming that the sender is a known medical provider). Upon receipt of the validation and authentication documentation from, for instance, a medical provider, the employee 510 and the employer are notified. Upon receipt of the validation of the disability, the employer may request a change in the accommodations originally requested by the employee 510. The employee 510 may approve or deny the change. Validation or authentication (or both) may require human approval or may be performed automatically.

Figure 7:
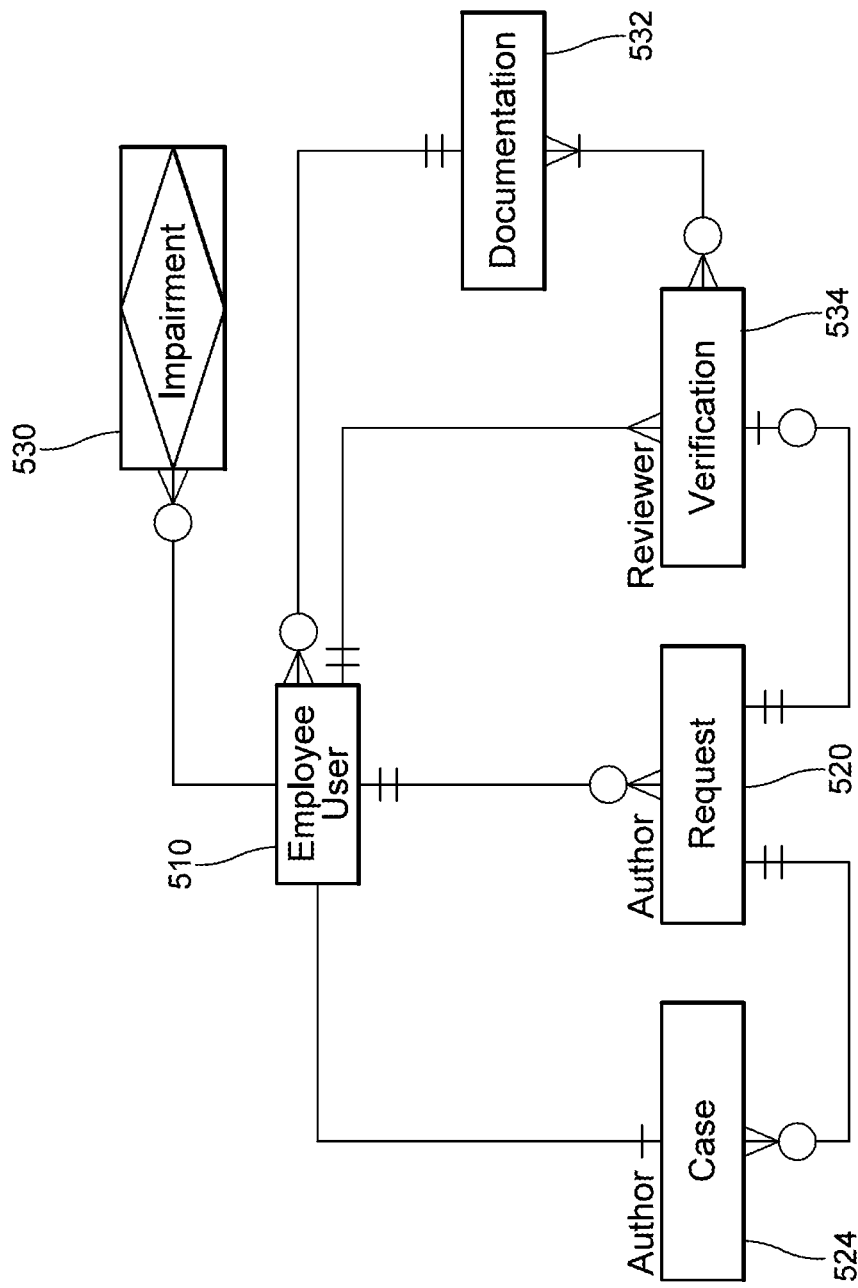
FIG. 7 illustrates details of example users.

FIG. 7 illustrates an example schematic loop of the verification process. At the draft step 702, an employee user drafts a request for an accommodation. At 704 the request is opened. The request may proceed directly to approval 714 or the request may be canceled 712, and a new case opened. The request may require verification 706 of the impairment. If verification is requested at 706, then the verification process 708 may proceed. If the verification 708 fails at 710, the request may be canceled 712 and a new request opened 704. As a non-limiting example, a failed verification may still lead to an approved case. Lack of an approved "verification" does not prevent an employer from approving an accommodation request.

The present disclosure additionally relates to automation of the verification process. By capturing data on the verification process, such as inspecting the physical or electronic signatures of medical providers, as well as looking at the medical providers themselves, metadata of the documentation, a machine learning model may be trained to automatically classify the verification documents into classifications including but not limited to "authenticated," "needs human inspection," or additional required classifications. Other classifications will be readily apparent to those skilled in the art. Another example use of the trained model is to classify into "authenticated", "needs a second document", "needs a third document" or "authentication failed" classifications. A trained machine learning model may automate the verification/authentication process and allow even fewer people access to details of the PHI. In addition, such machine learning models may also be trained to alert in the case of suspected attempts at fraud. Such an alert may include an internal staff member being notified to investigate further.

Once the accommodations have been agreed to between the employer and the employee 510, the accommodations may be administered, for example, by the employer. The employee 510 is asked to notify whether the employee 510 provided the accommodation. If the answer is yes, then the process ends. Some accommodations may be required on a recurring schedule, in which cases, the employee 510 will be asked to confirm that the employer has provided the accommodation on the same schedule as the accommodation is supposed to be administered. If the employee 510 states that the employer has not provided the accommodation, then the employer administrator is notified. The employer administrator may state that the accommodation was administered in which case a person is notified of the conflicting statements. If the employer is still trying to provide the accommodation, (e.g. as a non-limiting example, "we are working on it") then the confirmation schedule may be re-set until the employee 510 has the opportunity to confirm that the accommodation was administered.

Various data schema may be used. Each data set presented herein may include associated metadata, which may be stored along with other data. For instance, the time an account is created is stored with the account. The time of a most recent modification of an account is also stored. The location of the account modification (e.g. machine MAC address or IP address) may also be recorded in the metadata portion of the data for each account. Each request for an accommodation may also comprise such metadata. An employer entity has various fields describing it including but not limited to owner, ID number, name, website, logo, organization type, size, registration season, industry, payment processor, HQ address, domestic or international, employee URL, verification form, federal contractor, EEO compliance, section 503 progress, HR policy documentation, metadata such as time of creation of the data fields, and other such fields. A user (e.g. as non-limiting examples, an employee user, an employer user, or a $3^{rd}$ party users (aka internal staff)) may have a user identification which may include, name, email address, phone number, linked accounts, role(s), and permissions for using the system. The employee user may also have various data fields associated with the employee such as userID, status of employment, employee ID. The system may also store demographic data about the employee including but not limited to age, gender, sex, ethnicity, membership in a protected group (e.g. veteran status or tribal affiliation), and other such data. The employee user may enter a request for an accommodation and the request or the accommodation may include a stipulation. An example stipulation may include a time limitation on an accommodation, including but not limited to time bounded wheelchair access while someone is recovering from a broken leg.

Stipulation data fields may also be a part of the request for an accommodation. The request for accommodation data are entered into the negotiation, as the data from the employer. Other data fields may comprise verification from a medical provider and the negotiation of the impairment. The negotiation is the internal method for determining whether the request should be accommodated as suggested by the employee user, or whether the request should be modified with an alternative proposed accommodation or whether the request for accommodation is unreasonable. As a non-limiting example, a negotiation phase may comprise three options: accept the accommodation request, reject the accommodation request, or counter with an alternative accommodation.

After the accommodation has been provided, the system enters a monitoring phase. During the monitoring phase, the system may prompt an employer user to ask the employee whether the accommodation was provided. In an example, the system may automatically send an email or a text message to the employee asking whether the requested accommodation was provided. At a later time, the system may ask the employee a question including but not limited to whether the accommodation is still effective. Additional follow-up questions relating to the rapidity of the response to the request may also be used. Checking in with the employee may take place on a schedule such as weekly, monthly or after a set time delay after the case has been submitted (e.g. as a non-limiting example, 2 weeks after submission) or on some periodic basis. For instance, the system may ask the employee whether they have received their requested accommodation or after 2 weeks, the system may ask the employer whether they have approved the submitted case.

Documentation for a disability may not be required in all cases. In some instances, documentation may be requested by the employer. If, for example, an employee submits documentation of their disability, the documentation may require validation from an external source, including but not limited to a medical provider. If a case needs verification of impairment, the employee may be requested to provide contact information to the employee's medical provider. In addition, the employer may verify that the accommodation request is reasonable. The system may provide a means for communication between the employer and the employee regarding verification or also between a medical provider and the system.

A request must be originated by the employee, but submitting the case for evaluation is a separate step. After submission of a case, the employee may be prevented from then editing the case. The employee may create and save draft cases without submitting them. These draft cases may be deleted afterwards. Once a case has been submitted it can no longer be deleted, only canceled. Any submitted case must have a request for an accommodation. The employer user (e.g. as a non-limiting example, an HR Admin) is not permitted to see any cases which have been drafted but not submitted. The employer user may only view cases which have been submitted. The employer user may request verification of submitted cases. At any time prior to approval, the employee user may cancel a request. After approval, a request may not be canceled. If the disability is considered an obvious disability, then there is no requirement for verification.

When an employee has submitted a request, the case's status will be open until it has been addressed by the next party. When a request is declined, the case may be closed. If required, a new case may be opened until the employer and employee are both satisfied. A case may include the author (an employee), the impairment, a task, a timeframe, a status, an employer assigned designated person, a request, and any such relevant aspect. The request may include an accommodation, a stipulation (or details of the request), a status, and an author (e.g. an employee). If a case is bound in time, the frame may be for a limited time (e.g. starting Jan. 19, 2022 and ending Mar. 2, 2022) or for certain days or times (e.g. Tuesdays and Thursdays). For stipulations, all stipulations on a request must be accepted or declined as a whole. If a different set of stipulations are needed (e.g. as non-limiting examples, only two of five stipulations originally submitted), then a new request (e.g. with only those two stipulations and no others) must be created and submitted in a new request. Stipulations which were approved in previous requests may be declined in later requests, but must still be marked approved on those previous requests. Once the case has been submitted, then it will be assigned a case manager.

In the audit log, information about the processing of completed and current cases is visible. The employer user (e.g. as a non-limiting example, HR Admin) may access such information across any submitted cases. Such an employer user does not have access for cases which have been drafted but not submitted. The employee user may access this information only for those cases they have created, including their own drafted but not yet submitted cases.

While accommodations may be associated with limitations, a request for an accommodation can be made for either a disability or a limitation. As such, the term "impairment" encompasses both. Disabilities may be associated with many limitations. Limitations can affect multiple life activities. Accommodations are intended to mitigate specific limitations, but can be further identified by tags. These tags can be categories or characteristics of the accommodation, similar to the categories and subcategories used by the Job Accommodation Network (JAN). Tabs allow for easier browsing of accommodations and identifying appropriate accommodations when creating or reviewing a case, as well as an additional data point when analyzing system data and usage. When starting a case and requesting an accommodation, the employee user will choose either a disability or a limitation that the requested accommodation can address. This selection is the "impairment" and is one of a disability (tied to a set of limitations which are tied to life activities) or a limitation (tied to a life activity).

The present disclosure may include at least the following aspects:

Aspect 1: A method comprising: receiving an inquiry relating to a workplace accommodation; determining, based on the inquiry, one or more recommended workplace accommodations; outputting information indicative of the one or more recommended workplace accommodations; receiving a request for a workplace accommodation; evaluating, based on the request, whether the workplace accommodation meets a first criteria; validating, based on the request and via a medical provider, that the workplace accommodation meets a second criteria; and outputting a recommended workplace accommodation.

Aspect 2: The method of aspect 1, wherein the inquiry comprises information indicative of a medical condition, and wherein the one or more recommended workplace accommodations are based on the information indicative of the medical condition.

Aspect 3: The method of aspect 1, wherein the inquiry comprises information indicative of a disability, and wherein the one or more recommended workplace accommodations are based on the information indicative of the disability.

Aspect 4: The method of aspect 1, wherein the request for a workplace accommodation is based on the one or more recommended workplace accommodations.

Aspect 5: The method of aspect 1, further comprising receiving a confirmation that the recommended workplace accommodation has been offered.

Aspect 6: The method of aspect 1, wherein validating that the workplace accommodation meets a second criteria comprises transmitting from the medical provider to the user a description of the workplace accommodation and authenticating the transmitted description.

Aspect 7: A system comprising a computer processor and memory, the processor configured to perform the steps the method of aspect 1.

Aspect 8: A computer program product comprising a processor and memory for performing the steps of aspect 1.

Aspect 9: A method comprising: receiving a request for a workplace accommodation; evaluating, based on the request, whether the workplace accommodation meets a first criteria; validating, based on the request and via a medical provider, that the workplace accommodation meets a second criteria; and outputting a recommended workplace accommodation.

Aspect 10: The method of aspect 9, further comprising receiving a confirmation that the recommended workplace accommodation has been offered.

Aspect 11: The method of aspect 9, wherein validating that the workplace accommodation meets a second criteria comprises transmitting from the medical provider to the user a description of the workplace accommodation and authenticating the transmitted description.

Aspect 12: A system comprising a computer processor and memory, the processor configured to perform the steps the method of aspect 9.

Aspect 13: A computer program product comprising a processor and memory for performing the steps of aspect 9.

Aspect 14: A method comprising: receiving an inquiry relating to a workplace accommodation; determining, based on the inquiry, one or more recommended workplace accommodations; and outputting information indicative of the one or more recommended workplace accommodations.

Aspect 15: The method of aspect 14, wherein the inquiry comprises information indicative of a medical condition, and wherein the one or more recommended workplace accommodations are based on the information indicative of the medical condition.

Aspect 16: The method of aspect 14, wherein the inquiry comprises information indicative of a disability, and wherein the one or more recommended workplace accommodations are based on the information indicative of the disability.

Aspect 17: The method of aspect 14, wherein the request for an workplace accommodation is based on the one or more recommended workplace accommodations.

Aspect 18: A system comprising a computer processor and memory, the processor configured to perform the steps the method of aspect 14.

Aspect 19: A computer program product comprising a processor and memory for performing the steps of aspect 14.

Aspect 20: A method comprising: receiving a workplace accommodation request indicative of a request for workplace accommodation; transmitting, based on the workplace accommodation request, a validation request to a validation entity, wherein the validation request comprises information relating to one or more requested workplace accommodations; receiving. based on the validation request and from the validation entity, a medical validation indicating that the one or more requested workplace accommodations meets a criteria, wherein the medical validation is based on medical information that is not included in the workplace accommodation request or the validation request; and outputting, based on the medical validation, a recommended workplace accommodation.

Aspect 21: The method of aspect 20, further comprising receiving a confirmation that the recommended workplace accommodation has been offered.

Aspect 22: The method of aspect 20, wherein validating that the workplace accommodation meets a second criteria comprises transmitting from the medical provider to the user a description of the workplace accommodation and authenticating the transmitted description.

Aspect 23: A system comprising a computer processor and memory, the processor configured to perform the steps the method of aspect 20.

Aspect 24: A computer program product comprising a processor and memory for performing the steps of aspect 20.

Aspect 25: A method comprising: receiving a workplace accommodation request indicative of a request for workplace accommodation; transmitting, based on the workplace accommodation request, a validation request to a validation entity, wherein the validation request comprises information relating to one or more requested workplace accommodations; receiving, based on the validation request and from the validation entity, a medical validation indicating that the one or more requested workplace accommodations meets a criteria, wherein the medical validation is based on medical information that is not included in the workplace accommodation request or the validation request; and outputting, based on the medical validation, one or more negotiation options.

Aspect 26: The method of aspect 25, wherein the negotiation options comprise an accept option, a reject option, or a propose alternative option, or a combination thereof.

Aspect 27: A system comprising a computer processor and memory, the processor configured to perform the steps the method of aspect 25.

Aspect 28: A computer program product comprising a processor and memory for performing the steps of aspect 25.

Aspect 29: A method comprising a) requiring the employer to confirm the implementation of the accommodation details within a platform/application prior to transmitting the information to the employee; b) prompting the employee to confirm receipt and implementation of the accommodation details by the employer through the platform/application on their computing device; c) recording the employee's confirmation of the accommodation implementation within the platform/application; d) initiating periodic check-ins with the employee through the platform/application, wherein the periodic check-ins include a series of predetermined questions related to the effectiveness and continued implementation of the ADA accommodations; c) receiving feedback from the employee during the periodic check-ins, wherein the feedback is securely and confidentially stored within the platform/application; f) analyzing the received feedback to determine if any adjustments are necessary to the implemented accommodations; g) notifying the employer of any necessary adjustments to the implemented accommodations based on the analyzed feedback; h)

enabling the employer to implement adjustments to the accommodations as needed, and updating the accommodation details within the platform/application; and i) repeating steps b) through h) to continuously monitor and improve the accommodation implementation and feedback cycle for the employee, ensuring ongoing ADA compliance and employee satisfaction.

Aspect 30: A method comprising: a) collecting and storing ADA accommodations data for multiple employees within a platform/application, wherein the data includes employee conditions, types of accommodations, implementation status, and feedback on accommodations effectiveness; b) aggregating the accommodations data to generate industry-wide and company-specific averages, trends, and patterns; c) determining the likelihood of approval for a certain type of accommodation for a specific condition based on historical accommodations data within the platform/application; d) comparing the employer's ADA accommodations data with industry benchmarks and norms to identify areas of improvement or best practices; e) generating reports and visualizations of the insights and analytics within the platform/application, wherein the reports and visualizations highlight key metrics such as approval rates, accommodation costs, duration for accommodation implementation, and employee satisfaction levels; f) providing the employer with access to the insights and analytics within the platform/application enabling the employer to make informed decisions about accommodations and identify potential opportunities for improvements; g) continuously updating the insights and analytics based on the ongoing collection of accommodations data, maintaining relevance and accuracy; and h) enabling the employer to customize the insights and analytics by applying filters or selecting specific variables, allowing for targeted analysis and decision-making.

Aspect 31: The method of any one of aspects 1, 9, 14, 20, or 25, wherein outputting the recommended workplace accommodation comprises transmitting the recommended workplace accommodation to a workplace employer and a subject user of the workplace accommodation.

Aspect 32: The method of any one of aspects 1, 9, 14, 20, or 25, wherein outputting the recommended workplace accommodation comprises transmitting the recommended workplace accommodation to a workplace employer and a subject user of the workplace accommodation, wherein the transmitting to the workplace employer is prior to transmitting to the subject user; and further comprising: outputting a prompt indicative of a confirmation that the recommended workplace accommodation was implemented for the subject user; and receiving and recording a response to the prompt.

Aspect 33: The method of aspect 32, further comprising: outputting check-in prompts on a periodic basis indicative of one or more of the on-going implementation of the recommended workplace accommodation or the effectiveness of the recommended workplace accommodation.

Aspect 34: The method of aspect 33, further comprising: outputting an updated recommended workplace accommodation based at least on a response to the check-in prompts.

Many operating systems, including Linux, UNIX®, OS/2®, and Windows®, are capable of running many tasks at the same time and are called multitasking operating systems. Multi-tasking, as used herein, refers to the ability of an operating system to execute more than one operation (also referred to herein as an "executable") at the same time. Each executable runs in its own address space. Executables have no way to share any of their memory. Thus, it is impossible for any program to damage the execution of any of the other programs running on the system. The programs have no way to exchange any information except through the operating system (or by reading files stored on the file system).

Multi-process computing may be related to multi-tasking computing, as the terms task and process may be used interchangeably. Some operating systems may make a distinction between the two. The present disclosure relates to a system, a method, and/or a computer program product at any possible technical detail level of integration. A computer program product may include a computer readable storage medium (or media) having computer readable program instructions thereon for causing a processor to carry out aspects of the present disclosure. The computer readable storage medium can be a tangible device that can retain and store instructions for use by an instruction execution device.

A computer readable storage medium may be, as non-limiting examples, an electronic storage device, a magnetic storage device, an optical storage device, an electromagnetic storage device, a semiconductor storage device, any suitable combination of the foregoing, and any other such storage media known in the prior art. A non-exhaustive list of more specific examples of the computer readable storage medium includes but is not limited to a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire. Computer readable program instructions described herein can be downloaded to respective computing/processing devices from a computer readable storage medium or to an external computer or external storage device via a network. Networks include but are not limited to the Internet, a local area network, a wide area network and/or a wireless network. The network may include copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may include but are not limited to assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including but not limited to an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, entirely on the remote computer or server, or otherwise as known in the art. If entirely on the remote computer or server, the remote computer may be connected to the user's computer through any type of network, including a local area network (LAN) or a wide area network (WAN), or the connection may be made to an external computer (as a non-limiting example, through the Internet using an Internet Service Provider).

The present disclosure relates to using, in example aspects, electronic circuitry including, for example, programmable logic circuitry, field-programmable gate arrays (FPGA), or programmable logic arrays (PLA) that may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Computer readable program instructions may also be stored in a computer readable storage medium that can direct a computer, a programmable data processing apparatus, and/or other such devices to function in a particular manner. The computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process. The instructions which execute on the computer, other programmable apparatus, or another such device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s).

The present disclosure relates to alternative implementations where the functions noted in the blocks may occur out of the order noted in the Figures. For example, two blocks shown in succession may, in fact, be executed substantially concurrently, or in the reverse order, depending upon the functionality involved. It will also be noted that each block of the block diagrams and/or flowchart illustration, and combinations of blocks in the block diagrams and/or flowchart illustration, can be implemented by hardware-based systems (e.g., including but not limited to special purpose hardware-based systems) that perform the specified functions or acts, or that carry out combinations of special purpose hardware and computer instructions.

Although specific embodiments of the present disclosure have been described, it will be understood by those of skill in the art that there are other embodiments that are equivalent to the described embodiments. Accordingly, it is to be understood that the disclosure is not to be limited by the specific illustrated embodiments, but only by the scope of the appended claims.

From the above description, it can be seen that the present disclosure provides a system, computer program product, and method for the efficient execution of the described techniques. References in the claims to an element in the singular is not intended to mean "one and only" unless explicitly so stated, but rather "one or more." All structural and functional equivalents to the elements of the above-described example embodiments that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

While the foregoing written description of the disclosure enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are example only and that various modifications may be made within the scope of the present disclosure. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The disclosure should therefore not be limited by the described embodiment, method, and examples, but by all embodiments and methods within the scope and spirit of the disclosure. Accordingly, the present disclosure is not limited to the specific embodiments as illustrated herein, but is only limited by the following claims.

What is claimed is:

1. A method comprising:
 receiving, via a first user device associated with an employee, an inquiry relating to a workplace accommodation, wherein the workplace accommodation relates to an impairment of the employee and wherein the inquiry for a workplace accommodation does not disclose to an employer medical information specific to the employee;
 determining, based on the inquiry, one or more recommended workplace accommodations;

outputting, via the first user device, information indicative of the one or more recommended workplace accommodations;

receiving, via the first user device, a request for a workplace accommodation associated with the impairment of the employee, wherein the request does not disclose the impairment to the employer of the employee;

evaluating, based on the request, whether the workplace accommodation meets a first criteria;

causing output, via a second user device associated with the employer, information indicative of the request for a workplace accommodation without revealing any medical information specific to the employee;

receiving, via one or more of the first user device or the second user device, a request for validation of the workplace accommodation, wherein the request for validation comprises a request to verify the impairment;

validating, based on the request for validation and via a medical provider having access to medical information specific to the employee, that the workplace accommodation meets a second criteria;

causing output, in response to the validating that the workplace accommodation meets a second criteria and via the second user device, information indicative of a verification of the impairment without revealing any medical information specific to the employee; and outputting, via one or more of the first user device or the second user device, a select recommended workplace accommodation of the one or more recommended workplace accommodations, wherein the select recommended workplace accommodation is outputted via a user interface of the second user device accessed by the employer without revealing any medical information specific to the employee, and wherein the employer does not have access to information about the impairment through the user interface.

2. The method of claim 1, wherein the inquiry comprises information indicative of a medical condition or disability, and wherein the one or more recommended workplace accommodations are based on the information indicative of the medical condition or disability.

3. The method of claim 1, wherein the request for a workplace accommodation is based on the one or more recommended workplace accommodations.

4. The method of claim 1, further comprising receiving a confirmation that the select recommended workplace accommodation has been offered.

5. The method of claim 1, wherein validating that the workplace accommodation meets a second criteria comprises transmitting from the medical provider to a user associated with the inquiry a description of the workplace accommodation and authenticating the transmitted description.

6. The method of claim 1, wherein outputting the select recommended workplace accommodation comprises transmitting the select recommended workplace accommodation to the employer and the employee.

7. The method of claim 1, wherein outputting the select recommended workplace accommodation comprises transmitting the select recommended workplace accommodation to the first user device and the second user device, wherein the transmitting to the second user device is prior to transmitting to the first user device; and further comprising: outputting a prompt indicative of a confirmation that the select recommended workplace accommodation was implemented for the employee; and receiving and recording a response to the prompt.

8. The method of claim 7, further comprising: outputting check-in prompts on a periodic basis indicative of one or more of on-going implementation of the select recommended workplace accommodation or effectiveness of the select recommended workplace accommodation.

9. A method comprising:

receiving, via a first user device associated with an employee, a request for a workplace accommodation, wherein the workplace accommodation relates to an impairment of the employee and wherein the request for a workplace accommodation does not disclose medical information specific to the employee;

causing output, via a second user device associated with an employer of the employee, information indicative of the request for a workplace accommodation without revealing any medical information specific to the employee;

receiving, via one or more of the first user device or the second user device, a request for validation of the workplace accommodation, wherein the request for validation comprises a request to verify the impairment;

validating, based on the request for validation and via a medical provider having access to medical information specific to the employee, the request for the workplace accommodation;

causing output, in response to the validating the request for the workplace accommodation and via the second user device, information indicative of a verification of the impairment without revealing any medical information specific to the employee; and outputting, via one or more of the first user device or the second user device, a recommended workplace accommodation without revealing any medical information specific to the employee.

10. The method of claim 9, further comprising receiving a confirmation that the recommended workplace accommodation has been offered.

11. The method of claim 9, wherein outputting the recommended workplace accommodation comprises transmitting the recommended workplace accommodation to the first user device and the second user device, wherein the transmitting to the second user device is prior to transmitting to the first user device; and further comprising: outputting a prompt indicative of a confirmation that the recommended workplace accommodation was implemented for the employee; and receiving and recording a response to the prompt.

12. The method of claim 11, further comprising: outputting check-in prompts on a periodic basis indicative of one or more of on-going implementation of the recommended workplace accommodation or effectiveness of the recommended workplace accommodation.

13. The method of claim 9, further comprising causing output, via at least the second user device, one or more selectable options comprising an indication of one or more of an approval of the recommended workplace accommodation or proposed changes to the recommended workplace accommodation.

* * * * *